United States Patent [19]

Kroon

[11] Patent Number: 5,574,081
[45] Date of Patent: Nov. 12, 1996

[54] WATERBORNE CLAY-CONTAINING EMULSION PAINTS WITH IMPROVED APPLICATION PERFORMANCE

[75] Inventor: Gijsbert Kroon, Sliedreicht, Netherlands

[73] Assignee: Aqualon Company, Wilmington, Del.

[21] Appl. No.: 324,189

[22] Filed: Oct. 11, 1994

[51] Int. Cl.$^6$ ............................ C08K 5/15; C08K 3/26; C08L 5/00
[52] U.S. Cl. .................. 524/56; 524/366; 524/376; 524/425; 524/445; 524/447; 524/755; 524/757; 524/762; 524/767; 524/803
[58] Field of Search .................. 524/44, 56, 366, 524/376, 425, 445, 447, 755, 757, 762, 767, 803

[56] References Cited

U.S. PATENT DOCUMENTS

| | | | |
|---|---|---|---|
| 3,280,050 | 10/1966 | Johnson | 260/17 |
| 3,590,018 | 6/1971 | Gebura | 524/447 X |
| 5,140,099 | 8/1992 | Bostrom | 536/91 |

*Primary Examiner*—Paul R. Michl
*Assistant Examiner*—LaVonda R. DeWitt
*Attorney, Agent, or Firm*—David Edwards

[57] ABSTRACT

This invention relates to a paint composition comprising a clay-containing pigment system, a latex binder, a polysaccharide thickener, and 0.005% to 2%, based upon the weight of the pigment, of a blocking agent which serves to prevent more than 20% of the polysaccharide thickener from being adsorbed onto the clay pigment surface, whereby the paint composition exhibits improved appearance and application performance.

24 Claims, No Drawings

WATERBORNE CLAY-CONTAINING EMULSION PAINTS WITH IMPROVED APPLICATION PERFORMANCE

FIELD OF THE INVENTION

The invention relates to the use of hydroxyethylcellulose-based thickeners in hydrophilic clay-containing emulsion paints.

BACKGROUND OF THE INVENTION

Prior to the present invention, latex paints containing clay as a pigment extender or containing calcium carbonate with clay impurities as the pigment extender, made it difficult to work with hydroxyethylcellulose (HEC) or hydrophobically modified hydroxyethylcellulose (HMHEC) from an application point of view. These paints often showed a gel structure and drew threads when applied with a roller.

In waterborne emulsion paints, cellulose derivatives like hydroxyethylcellulose (HEC), methylhydroxyethylcellulose (MHEC), methylhydroxypropylcellulose (MHPC), ethylhydroxyethylcellulose (EHEC) and carboxymethylcellulose (CMC) are used as rheology modifiers. These cellulose ethers thicken latex paints, providing the paints with stability, water retention and a pseudoplastic flow behavior. The cellulose ethers are used in an amount of 0.1% w/w up to 4.0% w/w on total paint, depending on the binder content of the paint. Hydroxyethylcellulose (HEC) and hydrophobically modified hydroxyethylcellulose (HMHEC) can be considered as the more popular types of cellulose ethers for use; clays are used as pigment extenders in emulsion paints in the United States while calcium carbonate is the most widely used type in European flat emulsion paint formulations, although in certain European areas, silicates and dolomites are used as well.

In paint systems containing hydrophilic clays, strong adsorption of HEC and HMHEC onto these clays occurs. This can affect the performance of the polymers in these paints dramatically. In distemper paints, which are often based on calcium carbonate containing clay impurities like montmorrillonite or bentonite, this results in a gelly paint structure. This gelly structure does not allow a good flow and application of the paint. For this reason, methylcellulose derivatives and carboxymethylcellulose are the preferred thickeners in these paints, since these cellulose ethers do not strongly absorb, so do not show the undesired gelation. Modification of HEC or HMHEC is needed in order to make them suitable for use as thickeners for clay containing flat emulsion paints. The above-described performance deficiencies of HEC and HMHEC as a result of their strong adsorption onto clay are also valid for ethylhydroxyethylcellulose (EHEC) and hydrophobically modified ethylhydroxyethylcellulose (HMEHEC). It is in meeting this need that the present invention provides an advance in the state of the art of the use of HEC, HMHEC, EHEC and HMEHEC as thickeners in emulsion paints containing hydrophilic clays or calcium carbonate extenders containing clay impurities.

SUMMARY OF THE INVENTION

This invention relates to a paint composition comprising a clay-containing pigment system, a latex binder, a polysaccharide thickener, and 0.005% to 2%, based upon the weight of the pigment, of a blocking agent which serves to prevent more than 20% of the polysaccharide thickener from being adsorbed onto the clay pigment surface, whereby the paint composition exhibits improved appearance and application performance.

DETAILED DESCRIPTION OF THE INVENTION

It has been discovered that the appearance and application properties of clay-containing emulsion paints, thickened with certain cellulose derivatives such as HEC, HMHEC, EHEC or HMEHEC, can be enormously improved by combining these cellulose derivatives with so-called pre-blocking agents. These blocking agents limit or even prevent the adsorption of the thickener onto clays and clay-containing extenders.

In accordance with this invention, a cellulose derivative thickening agent for clay-containing latex paints is selected from the group consisting of one or more of the following:

a. Hydroxyethylcellulose (HEC) with a molecular weight of from about 200,000 to about 1,500,000 and a hydroxyethyl molar substitution (HE-MS) of 1.5 to 4.0;

b. Hydrophobically-modified hydroxyethylcellulose (HMHEC) with a molecular weight of from about 50,000 to about 1,000,000 and a HE-MS of 1.5 to 4.0 with a hydrophobic modification chain of $C_4$ to $C_{22}$ alkyl or $C_8$ to $C_{20}$ alkylaryl in an amount of 0.01 to 2.0 percent by weight based on total weight of the hydrophobically-modified hydroxyethylcellulose;

c. Ethylhydroxyethylcellulose (EHEC) with a molecular weight of from about 200,000 to about 1,500,000 and a HE-MS of 0.5 to 3.0 and a degree of ethyl substitution of 0.3 to 1.2; and d. Hydrophobically-modified ethylhydroxyethylcellulose (HMEHEC) with a molecular weight of from about 50,000 to about 1,000,000 and a HE-MS of 0.5 to 3.5 and a degree of ethyoxyl substitution of 0.3 to 1.2 with a hydrophobic modification chain of $C_4$ to $C_{22}$ alkyl or $C_8$ to $C_{20}$ alkylaryl in an amount of 0.01 to 2.0 percent by weight based on total weight of the hydrophobically-modified ethylhydroxyethylcellulose.

In accordance with this invention, the blocking agent is selected from the group consisting of one or more of the following:

a. Poly(ethylene oxide), poly(ethylene glycol), poly(propylene oxide) and poly(propylene glycol) with a molecular weight of from about 100 to about 1,000,000;

b. Poly(vinyl alcohol) with a molecular weight of from about 1,000 to about 500,000 and a degree of hydrolysis of from about 40 to about 90 percent;

c. Salts of poly(acrylic acid) and poly(methacrylic acid) and their acid equivalents with a molecular weight of from about 1,000 to about 1,000,000;

d. Nonionic surfactants of the type alkylarylethoxylate and alkylethoxylate with 4 to 100 oxyethylene (OE) units and a hydrophobic chain of $C_8$ to $C_{20}$ alkylaryl or $C_4$ to $C_{24}$ alkyl.

The upper limit of the blocking agent in the present invention is about 2.0% by weight, based on the total weight of the composition, with the preferred upper limit being 1.0% by weight. The lower limit of the blocking agent is 0.005% by weight, based on the total weight of the composition, with 0.1% by weight being the preferred lower limit. When this combination of thickener and blocking agent is used, the adsorption of the cellulose derivative onto clay or a clay-contaminated extender like Bianco Meudon Tipo A does not exceed 3 mg/g. Latex paints with the above-described thickener combinations do not have a gelly structure and can be applied to a substrate by roller without drawing undesired threads.

EXTENDER PIGMENTS

The types of extenders that can be used in this invention are basically two groups of products: a) clay-type extenders and b) calcium carbonate extenders contaminated with hydrophilic clay-types.

a. Clay-type Extenders

Examples of these clays are generally Kaolinites, chemically composed of $SiO_2$ (30–50 wt. %), $Al_2O_3$ (30–50 wt. %), small amounts of alkalis ($K_2O$, $Na_2O$) and iron oxide ($Fe_2O_3$). Other clays that may be used as extenders in this invention are calcined clays with low loss on ignition. Examples of such clays for use in the instant invention are:

| Clays | Manu-facturer | $SiO_2$ (wt. %) | $Al_2O_3$ (wt. %) | Loss on Ignition (wt. %) |
|---|---|---|---|---|
| Kaolin FP75 | Dorfner | 48 | 36 | 12 |
| Spesswhite | ECC* | 47 | 38 | 13 |
| DB Plate 1000 | Euroclay | — | — | — |
| China Clay Grade B | ECC | 48 | 37 | 12.1 |
| China Clay Grade C | ECC | 48 | 37 | 11.9 |
| China Clay Grade D | ECC | 47.5 | 37 | 12.1 |
| China Clay Grade E | ECC | 48.5 | 36.5 | 11.0 |
| Polestar 200 | ECC | 54.7 | 41.7 | — |
| Amazon 88 | CADAM | 45.1 | 37.8 | 13.9 |

*ECC stands for English China Clay b. Contaminated Carbonates

Calcium carbonates are available in relatively purified form like the Durcal-products, Omyacarb-series and Omyalite-series of OMYA. However, many producers of cheaper and less purified products also exist. These cheaper calcium carbonates can be contaminated with many types of clays. However, the contamination with very hydrophilic clays causes the problems with HEC in heavily pigmented paint systems. Examples of these clay contaminants are attapulgite clay, hectorite clay, montmorrillonites, and bentonite clay. One example of such a problem-causing calcium carbonate is the Bianco Meudon Tipo A used in the Italian paint market.

LATEX TYPES

The problem of strong structure build-up in the paint is mainly known in paint systems, where poly(vinyl acetate) VeoVA co-polymer binders are used as latex.

Examples of these binders which are partially stabilized with hydroxyethyl cellulose as protective colloid are:

| Binder | Marketed By |
|---|---|
| Ravemul PC2 | Enichem, Italy |
| Vinavil 03V | Montedipe, Italy |
| Uramul VV50 | DSM Resins, The Netherlands |
| Mowilith DM21 | Hoechst, Germany |
| Acrilem 30WAC | ICAP, Italy |

Latex paints of this invention provide excellent capacity to hide the substrate that it is to cover. The capacity to hide the substrate is controlled mainly by the pigment volume concentration (PVC) and the coating thickness. The PVC has certain limits dictated by economics and the capacity of the pigment binding vehicle. The latex paint of this invention, for example, when used in flat paints may have a PVC of from about 50 to about 100%. The coating thickness is determined in part by the viscosity developed in the composition. Other factors exist such as other coating properties and application characteristics, such as brush drag, flow, and leveling of the coating composition for developing the type of viscosity for a particular type of paint.

The practice of the invention is further illustrated by the following examples:

Adsorption experiments in the Examples were performed as follows: A 50 wt. % solids suspension of clay in water was prepared. 0.5 wt. % of thickener was added and dissolved in the pigment slurry or suspension and then stored for 24 hours at 25° C. The system was then centrifuged at 20,000 rpm for three hours. The amount of hydroxyethylcellulose or ethylhydroxyethylcellulose of the supernatant was determined via the Sealed Tube Zeisel method for measuring ethoxyl and hydroxyethyoxyl content.

These pigment slurries were also made in the presence of blocking agents in order to determine the effect of the blocking agent on the adsorption of the cellulosics onto clay and carbonate extenders.

TABLE 1

Example 1
The Adsorption of HEC and HMHEC Onto a Clay-Containing Extender As a Function of Different Types of Pre-Blocking Agents

| Example | Blocking Agent Type | % w/w | Adsorption onto Bianco Meudon Tipo A of HEC[a] (mg/g) |
|---|---|---|---|
| 1A | None | — | 4.5 |
| 1B | Calgon N[b] | 0.25 | 3.7 |
| 1C | Tamol 731[c] | 0.25 | 3.5 |
| 1D | PEG 400[d] | 0.25 | 4.8 |
| 1E | Tamol 963[e] | 0.25 | 3.8 |
| 1F | Lutrol E 4000[f] | 0.25 | 1.9 |
| 1G | Lopon 885[g] | 0.25 | 4.0 |
| 1H | Pigment Verteiler A[h] | 0.25 | 0.0 |
| 1I | Airvol 803[i] | 0.25 | 0.0 |
| 1J | Sodium Dodecyl Sulfate | 0.25 | 11.2 |
| 1K | Antarox CO430[j] | 0.25 | 4.0 |
| 1L | Antarox CO970[k] | 0.25 | 0.6 |

[a]HEC: Natrosol ® 250 MBR, marketed by Aqualon Company.
[b]Sodium hexametaphosphate wetting agent, marketed by Benckiser Knapsack.
[c]Copolymer of di-isobutylene maleic anhydride dispersant, marketed by Rohm & Haas.
[d]Poly(ethylene glycol) with molecular weight of 400.
[e]Sodium salt of poly(acrylic acid), dispersant, marketed by Rohm & Haas.
[f]Poly(ethylene oxide), marketed by BASF.
[g]Dispersant, sodium salt of poly(acrylic acid), marketed by Benckiser Knapsack.
[h]Ammonium salt of poly(acrylic acid) dispersant, marketed by BASF.
[i]Poly(vinyl alcohol), marketed by Air Products.
[j]Nonylphenol ethoxylate (4 EOs), marketed by GAF.
[k]Nonylphenol ethoxylate (50 EOs), marketed by GAF.

TABLE 2

| Example | Blocking Agent Type | % w/w | Adsorption onto Bianco Meudon Tipo A of HMHEC[a] (mg/g) |
|---|---|---|---|
| 1M | None | — | 6.7 |
| 1N | Calgon N | 0.25 | 9.4 |
| 1O | Tamol 731 | 0.25 | 12.5 |

TABLE 2-continued

| Example | Blocking Agent Type | % w/w | Adsorption onto Bianco Meudon Tipo A of HMHEC[a] (mg/g) |
|---|---|---|---|
| 1P | PEG 400 | 0.25 | 4.0 |
| 1Q | Tamol 963 | 0.25 | 4.0 |
| 1R | Lutrol E 4000 | 0.25 | 0.0 |
| 1S | Lopon 885 | 0.25 | 4.1 |
| 1T | Pigment Verteiler A | 0.25 | 0.8 |
| 1U | Airvol 803 | 0.25 | 0.0 |
| 1V | Sodium Dodecyl Sulfate | 0.25 | 11.7 |
| 1W | Antarox CO430 | 0.25 | 5.8 |
| 1X | Antarox CO970 | 0.25 | 2.5 |

[a]HMHEC: Natrosol Plus ® 330, marketed by Aqualon Company

The above-given examples 1A through 1X demonstrate that only specific products can be used as a blocking agent to limit the adsorption of HMHEC onto Bianco meudon Tipo A. Lutrol E 4000 (as marketed by BASF), a poly(ethylene glycol) with a molecular weight of approximately 4000, pigment Verteiler A (as marketed by BASF), an ammonium salt of poly(acrylic acid), Airvol 803 as marketed by Air Products), a poly(vinyl alcohol) (molecular weight about 10,000; 88-89% hydrolysis) and Antarox CO970 (as marketed by GAF), a nonylphenol ethoxylate (50 EO units) are able to reduce the adsorption of HMHEC onto the extender. These blocking agents are able to form hydrogen bonds with clay or the clay present as contaminant in calcium carbonate extenders. Higher molecular weight poly(ethylene glycol) (Lutrol E 4000) is more efficient than lower molecular weight material (PEG 400). Nonylphenol ethoyxylate surfactants become more efficient as a blocking agent when increasing the number of EO-units in the product (see Antarox CO970 versus Antarox CO430). The ammonium salt of poly (acrylic acid) is more efficient as a blocking agent than the sodium salt (see Pigment Verteiler A versus Lopon 885 and Tamol 963).

EXAMPLE 2

The differences in adsorption values are reflected in differences in paint properties of the paints based on the Bianco Meudon Tipo A and the various combinations of HMHEC and blocking agents. The following examples (2A–2T) exhibit the practice of the invention in a flat emulsion paint having a pigment volume concentration (PVC) of 94%. The paint samples were prepared under Cowles conditions with a high speed dissolver. The paint formulation is given in Table 3.

TABLE 3

Paint Formulation Containing Bianco Meudon as Pigment Extender; PVA: 94%; Solids: 58% w/w

| | Parts by Weight |
|---|---|
| Water | 287.1 |
| Preservative CA24 | 1.0 |
| Pigment Verteiler A | 1.0 |
| Calgon N | 1.5 |
| Agitan 280 | 1.0 |
| Ammonia | 1.0 |
| Bianco Meudon | 665.0 |
| Texanol | 2.0 |
| Ravemul PC2 | 33.0 |
| Thickener | by demand |
| Blocking Agent | 3.0 |
| Water | 97.5 |
| Total | 1093.1 |

The paint was thickened with Natrosol Plus® grade 330 HMHEC and Natrosol® 250 MBR HEC combined with different blocking agents. The test results are shown in Table 4 and Table 5.

TABLE 4

Combination of (Natrosol ® 250 MBR) HEC With Different Preblocking Agents in a Flat Emulsion Paint (PVC 94) Based on Ravemul PC2 With Bianco Meudon Tipo A As An Extender

| Example | HEC (Wt. %) | Blocking Agent Type | SV[1] | SYV[2] | Appearance[3] | Roller Application[4] |
|---|---|---|---|---|---|---|
| 2A | 0.36 | None | 109 | 800 | — | — |
| 2B | 0.28 | Pigment Verteiler A | 100 | 250 | + | + |
| 2C | 0.30 | Calgon N | 116 | 1600 | — | — |
| 2D | 0.24 | Sodium Dodecyl Sulfate | 101 | 900 | — | — |
| 2E | 0.31 | Tamol 731 | 107 | 700 | — | — |
| 2F | 0.33 | Antarox CO970 | 112 | 250 | + | + |
| 2G | 0.34 | Antarox CO430 | 106 | 450 | +— | + |
| 2H | 0.26 | Airvol 803 | 110 | 250 | + | + |
| 2I | 0.30 | Lutrol E 4000 | 114 | 200 | + | + |
| 2J | 0.37 | PEG 400 | 100 | 500 | +— | + |

[1]Stormer viscosity.
[2]Stormer Yield Value; maximum load in grams before spindle starts to rotate.
[3]Appearance of the paint with respect to gelly structure; ranked from strong gelation (—) to non-gelly (+).
[4]Applicability by roller in terms of ease of spreading and drawing of threads; ranked from very poor (—) to good (+).

TABLE 5

Combination of HMHEC (Natrosol Plus ® 330) With Different blocking Agents in a Flat Emulsion Paint (PVC 94) Based on Ravemul PC2 With Bianco Meudon Tipo A As An Extender

| Example | HEC (Wt. %) | Blocking Agent Type | SV[1] | SYV[2] | Appearance[3] | Roller Application[4] |
|---|---|---|---|---|---|---|
| 2K | 0.37 | None | 109 | 650 | — | — |
| 2L | 0.40 | Pigment Verteiler A | 108 | 200 | + | + |
| 2M | 0.26 | Calgon N | 114 | 1800 | — | — |
| 2N | 0.26 | Sodium Dodecyl Sulfate | 112 | 600 | — | — |
| 2O | 0.36 | Tamol 731 | 107 | 550 | — | — |
| 2P | 0.27 | Antarox CO970 | 108 | 150 | + | + |
| 2Q | 0.28 | Antarox CO430 | 106 | 350 | +— | +— |
| 2R | 0.37 | Airvol 803 | 109 | 200 | + | + |
| 2S | 0.35 | Lutrol E 4000 | 114 | 100 | + | + |
| 2T | 0.36 | PEG 400 | 100 | 300 | +— | + |

[1]Stormer viscosity.
[2]Stormer Yield Value; maximum load in grams before spindle starts to rotate.
[3]Appearance of the paint with respect to gelly structure; ranked from strong gelation (—) to non-gelly (+).
[4]Applicability by roller in term of ease of spreading and drawing of threads; ranked from very poor (—) to good (+).

EXAMPLE 3

Another experiment was performed to demonstrate that the effect of combining the cellulose ether with a blocking agent is also valid for EHEC and HMEHEC. EHEC was Bermocol E 351 FQ polymer and the EHEC was Bermocol EHM100 polymer. The influence of using a combination of HMEHEC and a blocking agent on the paint properties is shown in the flat emulsion paint (PVC94) based on Ravemul PC2 material. Examples 3A–3D illustrate these benefits (see Table 6).

TABLE 6

Combination of (HM)EHEC with Lutrol 4000 In a Flat Emulsion Paint (PVC 94) Based On Ravemul PC2 With Bianco Meudon Tipo A as an Extender

| Example | EHEC (wt %) | HME HEC (wt. %) | Lutrol E 4000 (wt. %) | SV[1] (KU) | SYV[2] (g) | Appearance[3] | Roller Application[4] |
|---|---|---|---|---|---|---|---|
| 3A | 0.35 | — | — | 106 | 700 | — | — |
| 3B | 0.31 | — | 0.25 | 109 | 200 | + | + |
| 3C | — | 0.34 | — | 110 | 600 | — | — |
| 3D | — | 0.29 | 0.25 | 111 | 150 | + | + |

[1]Stormer viscosity.
[2]Stormer Yield Value; maximum load in grams before spindle rotates.
[3]Appearance of the paint; gelly (—) to non-gelly (+).
[4]Applicability by roller; good (+) to very poor (—).

EXAMPLE 4

In paint systems with strong hydrophilic clays like Spesswhite, the amount of blocking agent needs to be increased in order to limit the adsorption of HEC, EHEC, HMHEC and HMEHEC onto these types of clay. This is illustrated by the results of adsorption experiments shown in Examples 4A and 4B (see Table 7) using Lutrol E 4000 as a blocking agent.

TABLE 7

Influence of the Addition of a Blocking Agent on the Adsorption of HEC (Natrosol 250 MBR) Onto Spesswhite, a Hydrophilic Clay ex ECC.

| Example | Wt % | Blocking Agent | Adsorption of HEC Onto Spesswhite (mg/g) |
|---|---|---|---|
| 4A | — | — | 10.0 |
| 4B | 0.25 | Lutrol E 4000 | 9.8 |
| 4C | 0.5 | Lutrol E 4000 | 3.6 |
| 4D | 1.0 | Lutrol E 4000 | 0.3 |

The combinations of HEC, EHEC, HMHEC or HMEHEC with blocking agents can be used in the form of a powder blend, fluidized polymer system or as a solution of subject materials. Products like poly(vinylpyrrolidone) and poly-(acrylamide) are expected to work as a blocking agent as well.

What is claimed is:

1. A paint composition consisting essentially of a hydrophilic clay containing pigment system, a latex binder, a polysaccharide thickener and 0.005% to 2%, based upon the weight of the pigment, of a blocking agent selected from the group consisting of poly(ethylene oxide), poly(ethylene glycol), poly(propylene oxide), poly(propylene glycol), poly(vinyl alcohol), poly(acrylic acid), salts of poly(acrylic acid), salts of poly(methacrylic acid), acrylic acid, methacrylic acid, and non-ionic surfactants selected from the group consisting of alkylarylethoxylates and alkylethoxylates which serves to prevent more than 20% of the polysaccharide thickener from being absorbed onto the clay pigment surface whereby the paint composition exhibits improved appearance and application performance.

2. The composition of claim 1 wherein the polysaccharide thickener is selected from the group consisting of hydroxyethylcellulose, hydrophobically modified hydroxyethylcellulose, ethylhydroxyethylcellulose, hydrophobically modified ethylhydroxyethylcellulose and mixtures thereof.

3. The composition of claim 2 wherein the polysaccharide thickener is hydroxyethylcellulose with a molecular weight of from about 200,000 to about 1,500,000.

4. The composition of claim 3 wherein the hydroxyethylcellulose has a molar substitution of 1.5 to 4.0.

5. The composition of claim 2 wherein the polysaccharide thickener is hydrophobically modified hydroxyethylcellulose with a molecular weight of from about 50,000 to about 1,000,000.

6. The composition of claim 5 wherein the hydrophobically modified hydroxyethyl cellulose has a hydroxyethyl molar substitution of 1.5 to 4.0.

7. The composition of claim 6 wherein the hydrophobically modified hydroxyethyl cellulose has a hydrophobic modification of $C_4$ to $C_{22}$ alkyl or $C_8$ to $C_{20}$ alkylaryl in an amount of 0.01 to 2.0% by weight based on total weight of the hydrophobically modified hydroxyethylcellulose.

8. The composition of claim 2 wherein the polysaccharide thickener is ethylhydroxyethylcellulose with a molecular weight of from about 200,000 to about 1,500,000.

9. The composition of claim 8 wherein the ethylhydroxyethylcellulose has a hydroxyethyl molar substitution of 0.5 to 3.0.

10. The composition of claim 9 wherein the ethylhycl-roxyethyl cellulose has a degree of ethyl substitution of 0.3 to 1.2.

11. The composition of claim 2 wherein the polysaccharide thickener is hydrophobically modified ethylhydroxyethylcellulose with a molecular weight of from about 50,000 to about 1,000,000.

12. The composition of claim 11 wherein the hydrophobically-modified ethylhydroxyethylcellulose has a hydroxyethyl molar substitution of 0.5 to 3.5.

13. The composition of claim 12 wherein the hydrophobically-modified ethylhydroxyethylcellulose has a degree of ethyoxyl substitution of 0.3 to 1.2.

14. The composition of claim 13 wherein the hydrophobically-modified ethylhydroxyethylcellulose has a hydrophobic modification of $C_4$ to $C_{22}$ alkyl or $C_8$ to $C_{20}$ alkylaryl in an amount of 0.01 to 2.0 percent by weight based on total weight of the hydrophobically-modified ethylhydroxyethylcellulose.

15. The composition of claim 1 wherein the blocking agent is selected from the group consisting of poly(ethylene oxide), poly(ethylene glycol), poly(propylene oxide), and poly(propylene glycol), whereby the blocking agent has a molecular weight of from about 100 to about 1,000,000.

16. The composition of claim 1 wherein the blocking agent is poly(vinyl alcohol) with a molecular weight of from about 1,000 to about 500,000.

17. The composition of claim 16 wherein the poly(vinyl alcohol) has a degree of hydrolysis of from about 40 to about 90 percent.

18. The composition of claim 1 wherein the blocking agent is selected from the group consisting of salts of poly(acrylic acid), salts of poly (methacrylic acid), acrylic acid, and methacrylic acid.

19. The composition of claim 18 wherein the salts have a molecular weight of from about 1,000 to about 1,000,000.

20. The composition of claim 1 wherein the nonionic surfactants have 4 to 100 oxyethylene units and a hydrophobic chain of $C_8$ to $C_{20}$ alkylaryl or $C_4$ to $C_{20}$ alkyl.

21. The composition of claim 1 wherein the clay containing pigment system comprises extender pigments selected from the group consisting of clays and calcium carbonates contaminated with hydrophillic clays.

22. The composition of claim 21 wherein the clay extenders are kaolinites or calcined clays with loss ignition.

23. The composition of claim 21 wherein the contaminated calcium carbonate extenders are selected from the group consisting of attapulgite clay, hectorite clay, montmorrillonites, and bentonite clay.

24. The composition of claim 1 wherein the paint composition has a pigment volume concentration of from about 50 to about 100.

* * * * *

UNITED STATES PATENT AND TRADEMARK OFFICE
CERTIFICATE OF CORRECTION

PATENT NO. : 5,574,081
DATED : November 12, 1996
INVENTOR(S) : Gijsbert Kroon

It is certified that error appears in the above-indentified patent and that said Letters Patent is hereby corrected as shown below:

Column 7, line 28, "EHEC" should read --HMEHEC--; and

In the Claims, Column 9, lines 47 and 48, "ethylhycl-roxyethyl" should read --ethylhydroxyethyl--.

Signed and Sealed this

Eleventh Day of November, 1997

*Attest:*

BRUCE LEHMAN

*Attesting Officer*  *Commissioner of Patents and Trademarks*